United States Patent
Gao et al.

(10) Patent No.: US 7,609,858 B2
(45) Date of Patent: Oct. 27, 2009

(54) DISPLACEMENT MEASUREMENTS USING PHASE CHANGES

(75) Inventors: Jun Gao, Mountain View, CA (US); Carl E. Picciotto, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 10/931,414

(22) Filed: Aug. 31, 2004

(65) Prior Publication Data

US 2006/0045313 A1   Mar. 2, 2006

(51) Int. Cl.
*G06K 9/00* (2006.01)
(52) U.S. Cl. ...................... 382/106; 382/294
(58) Field of Classification Search ................ 382/106, 382/107, 141–152, 236, 294, 284, 287; 348/87
See application file for complete search history.

(56) References Cited

U.S. PATENT DOCUMENTS

| | | | |
|---|---|---|---|
| 5,063,524 A | 11/1991 | Ferre et al. | |
| 5,149,980 A | 9/1992 | Ertel et al. | |
| 5,204,739 A | 4/1993 | Domenicali | |
| 6,195,475 B1 | 2/2001 | Beausoleil, Jr. et al. | |
| 6,628,845 B1 * | 9/2003 | Stone et al. | 382/294 |
| 2001/0053245 A1 * | 12/2001 | Sakai et al. | 382/151 |

FOREIGN PATENT DOCUMENTS

| | | |
|---|---|---|
| EP | 0480807 B1 | 4/1992 |
| EP | 1061417 A2 | 12/2000 |
| WO | WO 03/073367 A2 | 9/2003 |

* cited by examiner

*Primary Examiner*—Duy M Dang

(57) ABSTRACT

A measurement process or system transforms image data corresponding to images of an object to the frequency domain and analyzes the frequency domain data to determine a displacement of the object occurring between first and second images. Analysis in the frequency domain simplifies identification and handling of data expected to be noisy. In particular, frequencies corresponding to modes of vibration, lighting variation, or sensor error characteristic of a measurement system or frequencies corresponding to small magnitude frequency-domain data can be given little or no weighting in analysis that provides the displacement measurement. In one embodiment, Fourier transforms of shifted and unshifted images differ by a phase delay. A least square fit slope of the phase values associated with the phase delay can indicate displacements to accuracies less than 1% of a pixel width, thereby providing nanometer scale precision using imaging systems having a pixel width of about 1 µm.

24 Claims, 3 Drawing Sheets

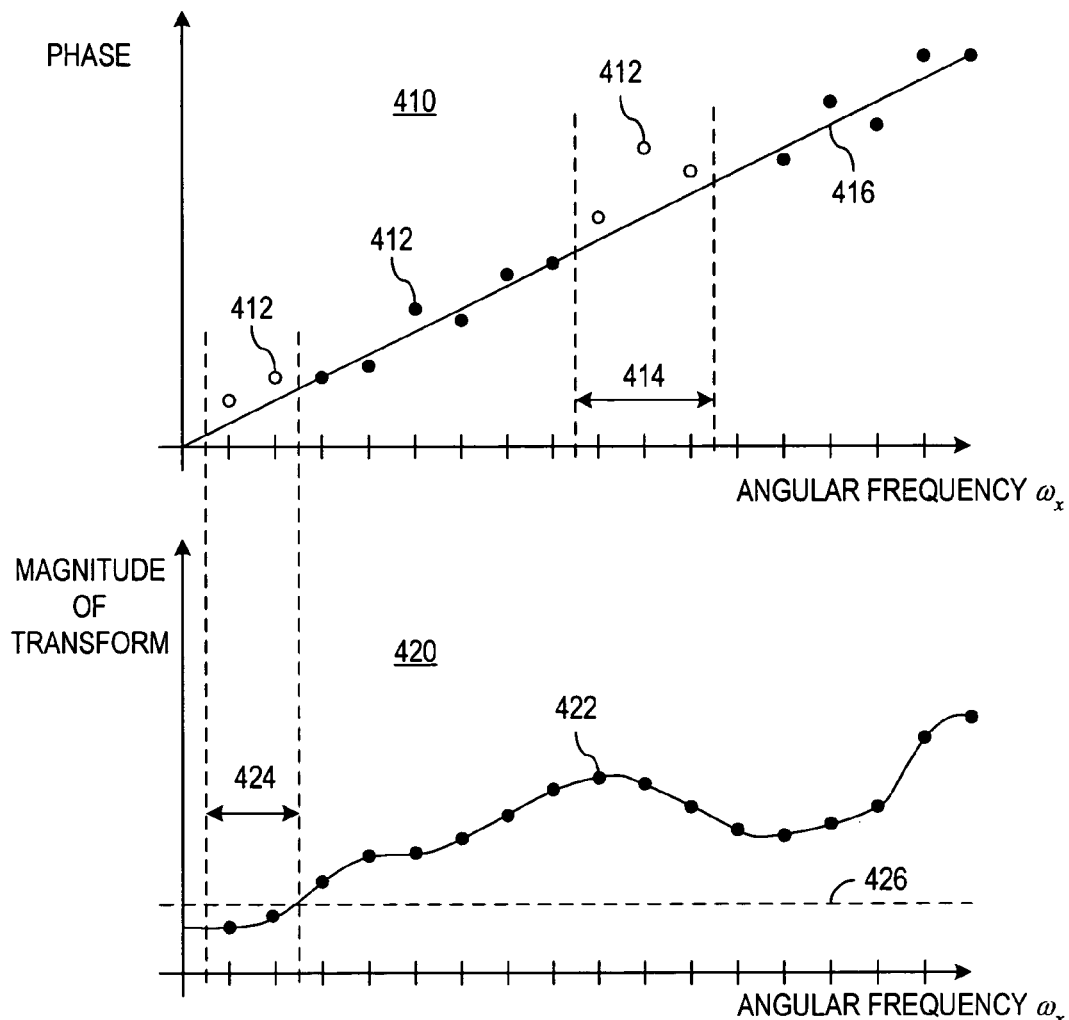
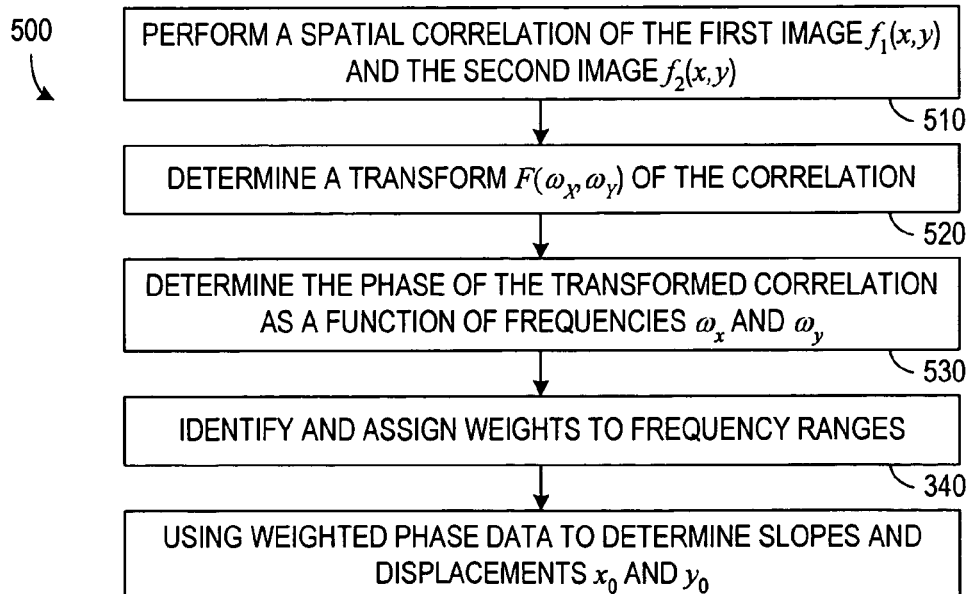

DISPLACEMENT MEASUREMENTS USING PHASE CHANGES

BACKGROUND

Known systems for precision alignment or displacement measurements have a number of common drawbacks. In particular, such systems are generally complex and expensive. Additionally, many such systems are inflexible in requirements, e.g., space and/or isolation requirements, making implementations awkward or impossible in many applications. Many require specific patterns such as grating patterns to be laid-down on the object being measured to produce moiré or diffraction patterns. Such patterns can be highly regular, so that spatial-uniqueness (or false matches) can become an issue. Also many precision measurement systems that are accurate at small dimensions are specifically designed for alignment sensing and cannot track movement or provide quantitative displacement information. Further, the systems that do provide quantitative displacement information are often unable to do so in real-time because of required scanning processes or significant post-processing.

Current measurement systems for tracking of an object can be broadly categorized as being optical or non-optical measurement systems. An interferometer is one example of an optical measurement system that can precisely measure the position or velocity of an object by interfering or comparing a beam reflected from the object with a reference beam. Other optical interference based measurement systems are known that track object movement by measuring the movement of diffraction patterns that gratings mounted on the object generate. Some other optical measurement systems use image correlations to detect the alignment or movement of known geometric patterns. Non-optical techniques are also available or proposed for tracking object movement. Examples of non-optical systems for precise measurements of small displacements include a Scanning Electron Microscope (SEM), an Atomic Force Microscope (AFM), or a capacitance sensing system.

An advantage of optical measurement systems when compared to the non-optical systems is the availability of precise and relatively inexpensive beam sources and optical elements. Accordingly, optical systems for alignment or tracking have been implemented at scales ranging from tracking astronomical bodies to tracking missiles to tracking integrated circuit structures.

One specific optical technique for measuring a displacement uses Fourier transforms of consecutive images of an object. A well-known property of Fourier transforms is that a position shift in an image results in a phase delay in the Fourier transform of the image. This property for a two-dimensional Fourier transform is expressed in Equation 1, where functions $f(x,y)$ and $f(x-x_0, y-y_0)$ can respectively represent intensity variations of an image and a shifted image and a function $F(\omega_x,\omega_y)$ represents the Fourier transform of function $f(x,y)$. In the Fourier transform of Equation 1, the phase $(\omega_x x_0 + \omega_y y_0)$ is a linear function of frequencies $(\omega_x, \omega_y)$ having slopes equal to the displacements $(x_0, y_0)$ of the image. However, determination of the displacement vector through phase delays in measurement systems have generally required transformations back to the spatial domain because comparisons of phases of transformed functions in the frequency domain correspond to subtractions of measurements that are believed to increase the effects of measurement noise.

Equation 1:

$$f(x-x_0, y-y_0) \Leftrightarrow e^{i(\omega_x x_0 + \omega_y y_0)} F(\omega_x, \omega_y)$$

Optical systems for tracking movement with nanometer scale accuracies are desired, particularly for manufacturing of nanometer-scale devices.

SUMMARY

In accordance with an aspect of the invention, a system or method for measuring a displacement of an object transforms data derived from images of an object to generate frequency domain data; determines phases corresponding to the frequency domain data, assigns weights to phases according known properties of the frequencies, and uses the phases and the weights to determine one or more slopes corresponding to change in the phases with change in frequency. The slopes indicate the displacements and can provide accuracies down a fraction of a pixel size, thereby providing nanometer scale precision using conventional digital imaging systems.

BRIEF DESCRIPTION OF THE DRAWINGS

FIG. 4 illustrates use of plots of the amplitude of a transformation and the measured values of phase for a slope measurement that indicates a displacement.

FIG. 5 shows a flow diagram for a process in accordance with an embodiment of the invention that determines displacements of an object from slopes of the phase of a transform of a correlation of images of the object.

Use of the same reference symbols in different figures indicates similar or identical items.

DETAILED DESCRIPTION

In accordance with an aspect of the invention, displacements much smaller than image pixels and smaller than the wavelength of illumination used for imaging can be observed from phases measured in transformed images. In particular, a slope of the phase as a function of the domain of the transformed space indicates a magnitude of a shift in the untransformed space. Determination of the slope in the transformed domain, e.g., the frequency domain, allows selection of data for reduction of measurement error. In particular, values associated with frequencies expected to be noisy, for example, frequencies corresponding to vibrations of the imaging system, spatial variations in illumination, or patterned sensor noise, can be ignored or given less weight in the measurement. Data associated with frequencies at which the transform is small can be similarly ignored given less weight.

Figure 1:
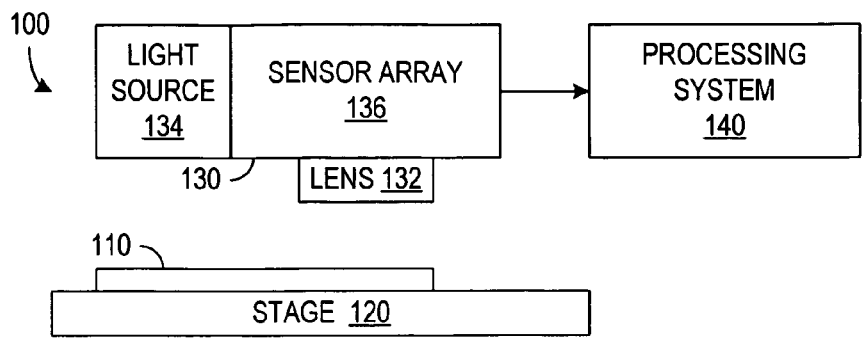
FIG. 1 is a block diagram of a measurement system in accordance with an embodiment of the invention.

FIG. 1 illustrates a measurement system 100 in accordance with an embodiment of the invention used to measure the movement of an object 110. Object 110 in an exemplary embodiment of the invention can be a wafer, a die, or any structure used in a manufacturing process of a nanometer-scale device. In FIG. 1, object 110 is mounted on a precision stage 120 that enables controlled movement of object 110. For example, stage 110 can be a N-point XY200Z20A-A nano-positioning stage available from nPoint Incorporated, which can be used to position a silicon die during processing.

An imaging system 130 captures images of object 110 and provides the images to a processing system 140 for analysis. Imaging system 130 can generally be any type of system capable of generating an image that can be divided into pixels corresponding to the portions of object 110 having a known size (or known sizes). Some specific implementations of imaging system 130 include video or still, digital or analog, color or black-and-white cameras. In the illustrated embodiment, imaging system 130 includes a lens 132, a light source 134, and a sensor array 136. Objective lens 132, which can be a microscope objective lens providing a magnification, is focused to form an image of object 110 on sensor array. Light source 134 illuminates object 110 during image capture and generally can be a conventional white light.

Sensor array 136, which can be a conventional CCD or CMOS sensor array captures and digitizes each image of object 110 for transmission to processing system 140. Generally, the image data from sensor array 136 is in the form of a pixel map containing pixel values, with each pixel value corresponding to an area of known size, e.g., 10 µm by 10 µm on object 110. The size and depth of the pixel map is generally not critical provided that the pixel map provides sufficient image data for analysis.

In one specific embodiment of imaging system 130, image sensor 136 is a monochrome digital camera such as the Pulnix™-1400CL has a 1.4M pixels CCD that provides 8-bit pixel values, a pixel size of 4.65 µm in the image plane, and a maximum frame rate of 30 Hz. Lens 132 is a system of two alternative lenses such as Neo S Plan 20x/0.40NA (Numerical Aperture) and 50x/0.80NA available from Olympus, and light source 134 is a power regulated light source from Schott fitted with a standard broadband white light (e.g., a Phillips 150W Focusline). Alternatively, a narrow band light source could reduce the chromatic aberration and hence allow for a better focus, resulting in a higher displacement resolution. However, measurement accuracies less than a pixel, e.g., less than 10 nm can be achieved using white light, so white light may be preferred for system simplicity and lower cost.

Processing system 140 analyzes the images from digital imaging system 130 and quantifies the displacement of object 110 from one image to the next. Processing system 140 can be implemented in any desired manner including but not limited to implementations as hardwired logic that performs the desired analysis or as a general-purpose computer executing software or firmware that performs the desired analysis.

Figure 2A:
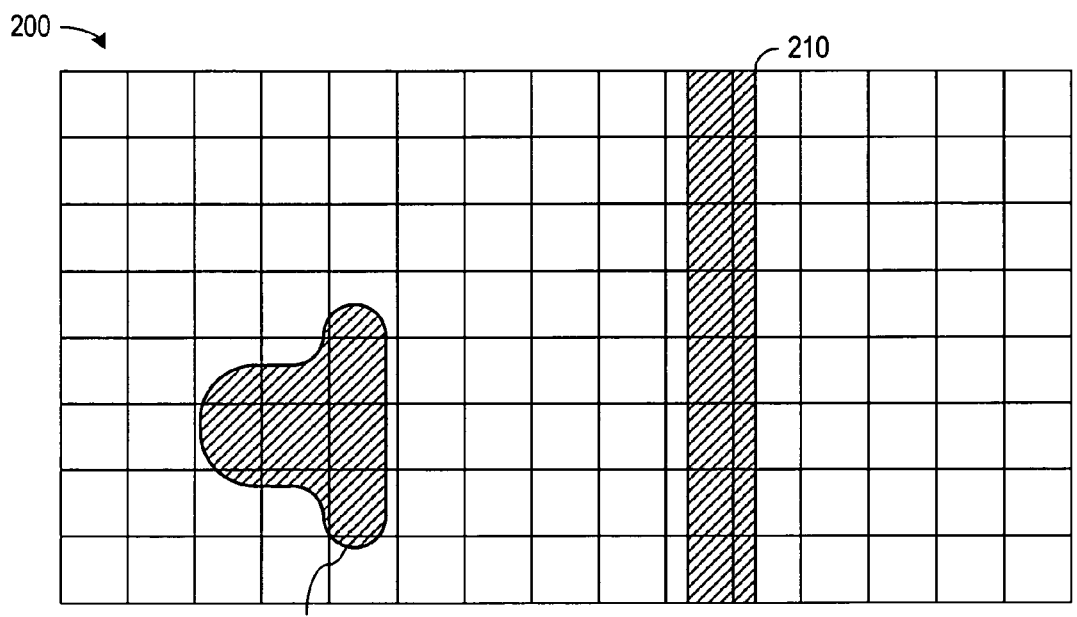
FIGS. 2A and 2B show unshifted and shifted images that an embodiment of the invention can use in phase delay measurements for tracking movement of an object.
Figure 2B:
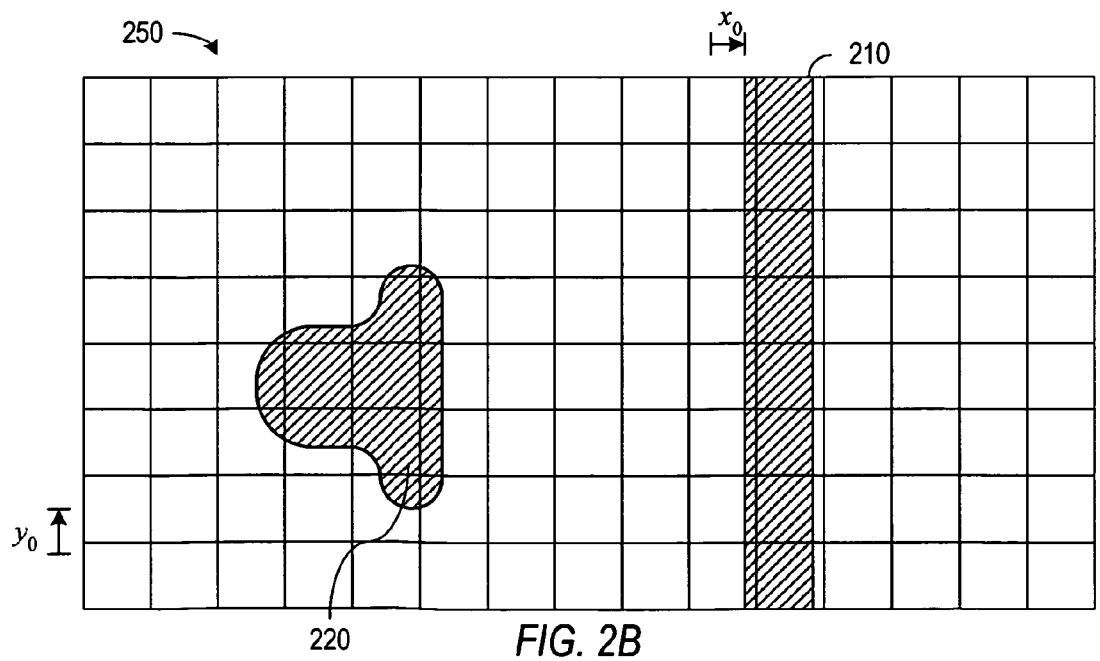

FIGS. 2A and 2B illustrate images 200 and 250 of an object respectively taken before and after the object and/or a camera moves. Both images 200 and 250 contain regions 210 and 220 that correspond to recognizable features on the object. Such features on the object include but are not limited to structures, markings, or discolorations on the object or an edge of the object. The features can be structures intentionally formed on the object for the purpose of measuring displacements, structures on the object that implement intended functions of the object, or random structures that just happen to be on the object. As described further below, displacement measurements do not require features 210 and 220 on the object to have predefined or known geometric shapes.

FIG. 2B shows features 210 and 220 that are shifted by displacements $x_0$ and $y_0$ respectively along x and y directions relative to the locations corresponding to features 210 and 220 in FIG. 2A. Grids overlying respective images 200 and 250 indicate how portions of images 200 and 250 can be mapped to pixels. Displacements $x_0$ and $y_0$ are generally not equal to an integer multiple of the pixel size, so that an area of the object corresponding to a single pixel in image 200 will generally form portions of multiple pixel values of array 250 and vice versa. Accordingly, when displacements $x_0$ and $y_0$ are fractions of a pixel, each pixel value corresponding to a pixel of image 250 will generally not have an exactly corresponding pixel value in a pixel map corresponding to image 200, but ignoring measurement errors, the pixel values in array 250 depend mathematically on the pixel values in array 200 and displacements $x_0$ and $y_0$.

Figure 3:
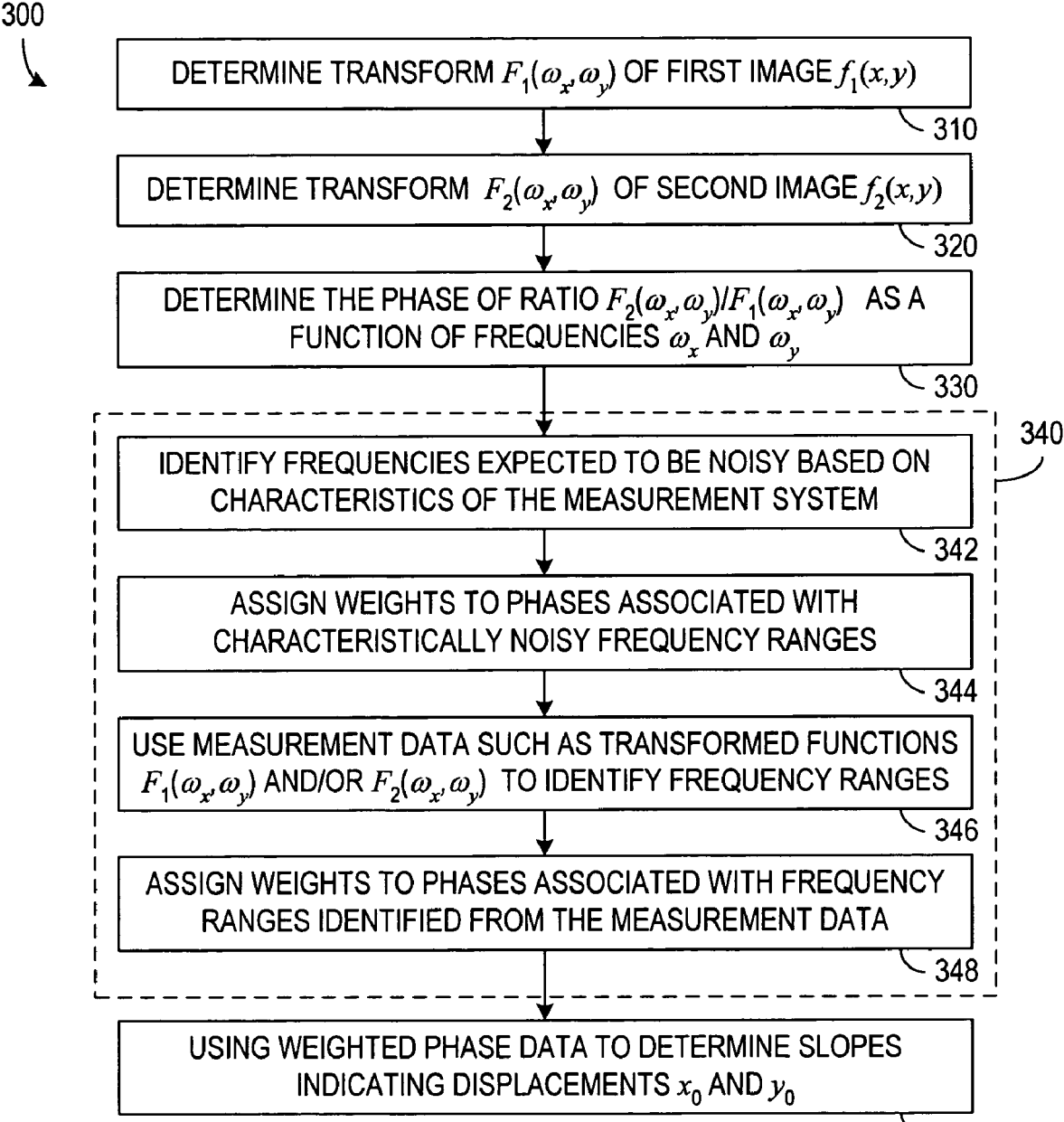
FIG. 3 shows a flow diagram for a process in accordance with an embodiment of the invention that determines displacements of an object from slopes of the phase of a ratio of transformed images of the object.

FIG. 3 is a flow diagram of a process 300 that extracts measurements of displacements $x_0$ and $y_0$ from pixel data associated with a pair of images. Process 300 can be performed by a processing system such as processing system 140 of FIG. 1, and one embodiment of the invention is a computer-readable storage medium such as a floppy disk, a CD, a DVD, or a memory device containing a set of instructions or routines that implements process 300. In the following, functions $f_1(x,y)$ and $f_2(x,y)$ are respectively used to represent the pixel data for the first and second images that are being analyzed. In general, the pixel data consists of discrete pixel values indexed by integer values of x and y.

The initial step 310 of process 300 performs a transform such as a Fourier transform (or a Discrete Fourier transform) on the pixel data $f_1(x,y)$ of the first image to generate a transformed function $F_1(\omega_x,\omega_y)$. Transformed function $F_1(\omega_x,\omega_y)$ like the pixel data in the spatial domain consists of discrete values, but the discrete values in the frequency domain are indexed by discrete values of angular frequencies $\omega_x$ and $\omega_y$. As an illustrative embodiment, the following description of process 300 assumes that transformed function $F_1(\omega_x,\omega_y)$ is the Fourier transform (or the Discrete Fourier transform) of pixel data $f_1(x,y)$, but as described further below, transforms other than Fourier transforms could alternatively be used.

Step 320 transforms the pixel data $f_2(x,y)$ of the second image to generate a transformed function $F_2(\omega_x,\omega_y)$. Since the second image is theoretically the same as the first image after a shift operation, the Fourier transformed functions $F_1(\omega_x,\omega_y)$ and $F_2(\omega_x,\omega_y)$ theoretically should satisfy Equation 2. Since transformed functions $F_1(\omega_x,\omega_y)$ and $F_2(\omega_x,\omega_y)$ are determined from measured pixel data $f_1(x,y)$ and $f_2(x,y)$, Equation 2 will generally be only an approximation.

Equation 2:

$$F_2(\omega_x,\omega_y) \approx e^{i\omega_x x_0 + i\omega_y y_0} F_1(\omega_x,\omega_y)$$

Step 330 determines the phase $\theta(\omega_x,\omega_y)$ of the ratio of transformed functions $F_1(\omega_x,\omega_y)$ and $F_2(\omega_x,\omega_y)$ for the range of frequencies $\omega_x$ and $\omega_y$. As shown in Equation 3, phase $\theta(\omega_x,\omega_y)$ is approximately equal to $\omega_x x_0 + \omega_y y_0$. Accordingly, displacements $x_0$ and $y_0$ can be determined from the slopes of phase $\theta(\omega_x,\omega_y)$.

Equation 3:

$$\theta(\omega_x, \omega_y) \equiv \angle \frac{F_2(\omega_x, \omega_y)}{F_1(\omega_x, \omega_y)} \cong \omega_x x_0 + \omega_y y_0$$

Slopes of phase $\theta(\omega_x,\omega_y)$ can be determined using conventional analysis techniques such as a least square fit on all of the phase values associated with all of the discrete values of frequencies $\omega_x$ and $\omega_y$. However, in accordance with an aspect of the invention, a step 340 assigns weightings to values of the phase $\theta(\omega_x,\omega_y)$ based on known properties of frequencies $\omega_x$ and $\omega_y$. In the illustrated embodiment, step 340 includes a step 342 that identifies ranges of frequencies $\omega_x$ and $\omega_y$ that are expected to be noisy, based on known characteristics of the measurement system, and a step 344 then assigns weights to phase values corresponding to the identified frequencies.

Noisy frequencies may, for example, correspond to a mode of vibration of the measurement system, a frequency of the illumination pattern used when capturing images, or periodic sensor noise to name a few examples. The frequencies identified in step 342 depend on the properties of the measurement system and hence may be known before the start of any particular measurement using process 300.

Step 346 uses measurement data to identify noisy frequencies or frequencies having any other known property. These identified frequencies may be unique to specific measurements and in particular may depend on the features of the object being measured. In an exemplary embodiment of the invention, step 346 uses the magnitudes of transformed functions $F_1(\omega_x,\omega_y)$ and/or $F_2(\omega_x,\omega_y)$ to detect frequency ranges where measurement error may be a more significant factor. For example, when either transformed function is particularly small, i.e., having a magnitude approaching the error, the determined phase $\theta(\omega_x,\omega_y)$ may be undependable. Step 346 more generally can identify the numerical problem areas such as noisy frequencies with low SNR in magnitude response as well as aliasing. Step 346 can be, but is not required to be, performed on-the-fly or in real time during measurement process 300.

Steps 344 and 348 assign weights to the frequencies identified in steps 342 and 346. The two types of noisy frequencies are fundamentally different types, so that steps 344 and 348 may use different types of masks/weightings. In a simple example of weighting, values of phase $\theta(\omega_x,\omega_y)$ corresponding to ranges of frequencies $\omega_x$ and $\omega_y$ identified in step 342 or 346 can be assigned zero weight. Alternatively, fractional weightings may be assigned based on measurement, e.g., transformed functions $F_1(\omega_x,\omega_y)$ and $F_2(\omega_x,\omega_y)$, or as required for the particular slope determination technique employed in step 350.

Step 350 uses the weightings and the phase $\theta(\omega_x,\omega_y)$ to determine slopes that indicate displacements $x_0$ and $y_0$. For example, step 350 can ignore zero-weighted or masked values when fitting the phases to a linear function or otherwise determining slopes that indicate displacements $x_0$ and $y_0$. Any desired fitting technique can be employed. For example, step 350 could employ a general maximum likelihood method or a least-square fit.

FIG. 4 shows a plot 410 of determined values 412 of phase $\theta(\omega_x,\omega_y)$ for illustration of fitting processes. In plot 410, phase values 412 correspond to a set of frequencies $\omega_x$ when frequency $\omega_y$ is fixed. A frequency region 414 corresponds to frequencies $\omega_x$ for which characteristics of the measurement system indicate that phase values 412 are noisy. The phase values 412 in region 414 can thus be eliminated from the fitting process.

A plot 420 in FIG. 4 shows the values 422 of the transformed function $F_1(\omega_x,\omega_y)$ or $F_2(\omega_x,\omega_y)$ over the same frequency range used in plot 410. Values 422 in a frequency region 424 are smaller than a threshold level 426 and therefore may provide a low signal-to-noise ratio (SNR). Corresponding phase values 412 in frequency region 424 can thus be masked/unused during a fitting process or alternatively weights can be assigned to values 412 that depend on the magnitude values 422 of the transformed function.

A line 416 illustrates a best-fit line based on the weightings of phase values 412 that are not eliminated from the fitting process. More generally, values for the full range of frequencies $\omega_x$ and $\omega_y$ can be fit to a plane, where line 416 is in the plane and corresponds to a fixed value of frequency $\omega_y$. Slopes of the plane along $\omega_x$- and $\omega_y$-directions in the frequency domain respectively indicate the displacements $x_0$ and $y_0$. In particular, the slopes measured for the best-fit lines or plane will be equal to the displacements $x_0$ and $y_0$ if appropriate units are used for x, y, $\omega_x$, and $\omega_y$. If variables x and y are in units of pixels, then the discrete frequencies $\omega_x$, and $\omega_y$ are multiples $2\pi$/pixel, and the displacements $x_0$ and $y_0$ will be measured in pixels or fractions thereof. A measurement in conventional units such as nanometers can be found from the pixel size. For example, with pixels corresponding to 1 μm by 1 μm areas of the object, measurements to an accuracy of about 0.01 pixels indicate displacements $x_0$ and $y_0$ to an accuracy of about 10 nm.

Process 300 of FIG. 3 can be varied in a number of ways in keeping with the invention. In one variation, instead of determining the phase $\theta(\omega_x,\omega_y)$ from the ratio of transformed functions $F_1(\omega_x,\omega_y)$ and $F_2(\omega_x,\omega_y)$, phases $\theta_1(\omega_x,\omega_y)$ and $\theta_2(\omega_x,\omega_y)$ can be independently determined for transformed functions $F_1(\omega_x,\omega_y)$ and $F_2(\omega_x,\omega_y)$, respectively, for example, by conversion of the complex values of transformed functions $F_1(\omega_x,\omega_y)$ and $F_2(\omega_x,\omega_y)$ to polar coordinates. A difference $\theta_2(\omega_x,\omega_y)-\theta_1(\omega_x,\omega_y)$ then contains substantially the same information as the phase $\theta(\omega_x,\omega_y)$ calculated from the ratio. However, division is avoided when determining the difference of phases, which may provide a better result for numerical and computer operation because of the possibility of division by a singularity and magnification of noise.

Another variation of process 300 determines the phase $\theta(\omega_x,\omega_y)$ from the product of one transformed function $F_1(\omega_x,\omega_y)$ or $F_2(\omega_x,\omega_y)$ and the complex conjugate of the other transformed function $F^*_2(\omega_x,\omega_y)$ or $F^*_1(\omega_x,\omega_y)$. The phase $\theta(\omega_x,\omega_y)$ determined from the product is the same as the phase $\theta(\omega_x,\omega_y)$ determined from the ratio because division by a complex value is equivalent to the combination of multiplication by the complex conjugate of the value and division by the magnitude of the value and the omitted division by the magnitude, i.e., by a real value, has no effect on the phase.

FIG. 5 illustrates a displacement measurement process 500 according to yet another embodiment of the invention. Process 500 begins with a step 510 of determining a spatial correlation of the first and second images. Equation 5 indicates the general form of a spatial correlation for continuous functions $f_1(x,y)$ and $f_2(x,y)$.

Equation 5:

$$f_1(x,y) \otimes f_2(x,y) \equiv \int_{-\infty}^{\infty} f_1(s,t) f_2(s+x, t+y) \, ds \, dt$$

Step 520 determines the Fourier transform of the spatial correlation. It can be shown that the Fourier transform of the spatial correlation of two functions is equal to the product of the Fourier transform of the first function and the complex conjugate of the Fourier transform of the second function as shown in Equation 5. Accordingly, step 530 determines the phase of the transformed correlation function to determine the same phase $\theta(\omega_x,\omega_y)$ as found in step 330 of FIG. 3. Process 500 can then be completed by step 340 identifying and assigning weightings for regions in the $\omega_x$-$\omega_y$ plane and step 350 finding the slopes of phase $\theta(\omega_x,\omega_y)$.

Equation 5:

$$f_1(x,y) \otimes f_2(x,y) \xrightarrow{\text{Fourier}} F_1(\omega_x,\omega_y) F^*_2(\omega_x,\omega_y)$$

The above descriptions of selected embodiments of the invention have concentrated on processes using Fourier Transforms. Fourier Transforms have the desirable property that shifts in the spatial domain result in phase delays in the frequency domain as indicated above in Equations 1 and 2. However, other transformations that transform a shifted function to a separable combination of the transform of the unshifted function and a factor depending on the shift $x_0$ could be similarly used to measure the shift $x_0$. Equations 6 illustrate an example of suitable behavior for a transform that permits separation of a function $g(x_0)$ from the transform of the shifted function for determination of shift $x_0$. Examples of such transforms include z-transforms, Discrete Cosine Transforms (DCTs), and Wavelet transforms with certain base function.

Equation 6:

$$f(x) \xrightarrow{\text{Transfrom}} F'(\omega) \text{ and}$$

$$f(x - x_0) \xrightarrow{\text{Transfrom}} g(x_0) F'(\omega)$$

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A method for measuring a displacement, comprising:
   capturing a first image containing an object before the displacement;
   capturing a second image containing the object after the displacement;
   transforming, by a processor or computer, data corresponding to the first image and the second image into frequency domain data;
   determining phases corresponding to the frequency domain data;
   identifying at least one frequency of the phases having a known property;
   assigning weights to the phases dependent on the identified at least one frequency; and
   using the phases and the weights to determine a slope corresponding to change in phase with change in frequency, wherein the slope indicates the displacement.

2. The method of claim 1, wherein transforming data comprises applying a Fourier transform.

3. The method of claim 1, wherein transforming data comprises:
   transforming the first image to the frequency domain in which the first image corresponds to first transformed data; and
   transforming the second image to the frequency domain in which the second image corresponds to second transformed data.

4. The method of claim 3, wherein transforming data further comprises determining respective ratios of the first transformed data and the second transformed data to generate the frequency domain data.

5. The method of claim 3, wherein transforming data further comprises determining respective products of the first transformed data and complex conjugates of the second transformed data to generate the frequency domain data.

6. The method of claim 3, wherein determining the phases comprises:
   determining first phases corresponding to the first transformed data;
   determining second phases corresponding to the second transformed data; and
   determining respective differences between the second phases and the first phases.

7. The method of claim 1, wherein transforming data comprises:
   determining a correlation of the first image and the second image in a space domain; and
   transforming the correlation to the frequency domain.

8. The method of claim 1, wherein identifying at least one frequency having the known property comprises identifying a first frequency indicated to be noisy as a result of characteristics of a system that captures the first and second images.

9. The method of claim 8, wherein identifying at least one frequency comprises identifying that the first frequency corresponds to a frequency of vibration of a system that captures the first and second images.

10. The method of claim 8, wherein identifying at least one frequency comprises identifying that the first frequency corresponds to a frequency of variation in lighting used when capturing the first and second images.

11. The method of claim 8, wherein identifying at least one frequency comprises identifying that the first frequency corresponds to a frequency of sensor noise.

12. The method of claim 1, wherein identifying at least one frequency comprises identifying that a magnitude of the frequency-domain data corresponding to the at least one frequency is small when compared to the frequency-domain data corresponding to other frequencies.

13. The method of claim 1, wherein a weight for the phase corresponding to the identified at least one frequency is zero, and determining the slope does not use a phase corresponding to the identified at least one frequency.

14. The method of claim 1, wherein using the phases and the weights to determine the slope comprises performing a least square fit to the phases.

15. The method of claim 1, wherein determining the slope indicates the displacement to an accuracy is a fraction of a width of a pixel in the first image.

16. The method of claim 1, wherein determining the slope indicates the displacement to an accuracy less than a wavelength of light used when capturing the first and second images.

17. A measurement system comprising:
   an image capture device configured to capture images of an object; and
   a processing system coupled to receive image data from the image capture device, wherein the processing system implements a measurement process that functions to:
   transform data corresponding to a first image and a second image of an object into frequency domain data;
   determine phases corresponding to the frequency domain data;
   identify at least one frequency of the phases having a known property;
   assign weights to the phases dependent on the identified at least one frequency; and
   use the phases and the weights to determine a slope corresponding to change in phase with change in frequency, wherein the slope indicates a displacement of the object.

18. The system of claim 17, wherein transforming data comprises applying a Fourier transform.

19. The system of claim 17, wherein determining the slope indicates the displacement to an accuracy that is a fraction of a width of a pixel in the first image.

20. The system of claim 17, wherein determining the slope indicates the displacement to an accuracy less than a wavelength of light used when capturing the first and second images.

21. A system for measuring a displacement, comprising:

means for capturing a first image of an object before the displacement and a second image of the object after the displacement;

means for transforming data corresponding to the first image and the second image into frequency domain data;

means for determining phases corresponding to the frequency domain data;

means for identifying at least one frequency of the phases having a known property;

means for assigning weights to the phases dependent on the identified at least one frequency; and means for using the phases and the weights to determine a slope corresponding to change in phase with change in frequency, wherein the slope indicates the displacement.

22. The system of claim 21, wherein the means for identifying at least one frequency having the known property comprises means for identifying a first frequency indicated to be noisy as a result of characteristics of a system that captures the first and second images.

23. The system of claim 21, wherein means for identifying at least one frequency comprises means for identifying that a magnitude of the frequency-domain data corresponding to the first frequency is small when compared to the frequency-domain data corresponding to other frequencies.

24. A computer-readable storage medium containing a set of instructions comprising:

a routine for transforming data corresponding to a first image of an object and a second image of the object into frequency domain data;

a routine for determining phases corresponding to the frequency domain data;

a routine for identifying at least one frequency of the phases having a known property;

a routine for assigning weights to the phases dependent on the identified at least one frequency; and a routine for using the phases and the weights to determine a slope corresponding to change in phase with change in frequency, wherein the slope indicates a displacement of the object.

* * * * *